No. 779,927. PATENTED JAN. 10, 1905.
A. J. GRIFFITH.
NECK STALL.
APPLICATION FILED JUNE 20, 1904.

Witnesses
Inventor
A. J. Griffith
Attorneys

No. 779,927.

Patented January 10, 1905.

UNITED STATES PATENT OFFICE.

ALBERT J. GRIFFITH, OF ST. HELENA, CALIFORNIA.

NECK-STALL.

SPECIFICATION forming part of Letters Patent No. 779,927, dated January 10, 1905.

Application filed June 20, 1904. Serial No. 213,412.

*To all whom it may concern:*

Be it known that I, ALBERT J. GRIFFITH, a citizen of the United States, residing at St. Helena, in the county of Napa, State of California, have invented certain new and useful Improvements in Neck-Stalls; and I do hereby declare the following to be a full, clear, and exact description of the invention, such as will enable others skilled in the art to which it appertains to make and use the same.

This invention relates to neck-stalls for animals, and has for its object to provide a device which may be placed upon the neck of an animal and which will prevent the animal from bending its neck to reach its body. The device is particularly adapted for use to prevent cows from sucking their own milk.

Figure 1:
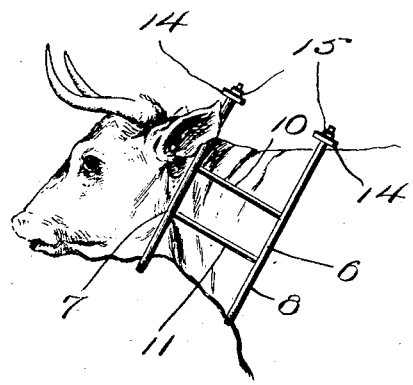
Figure 2:
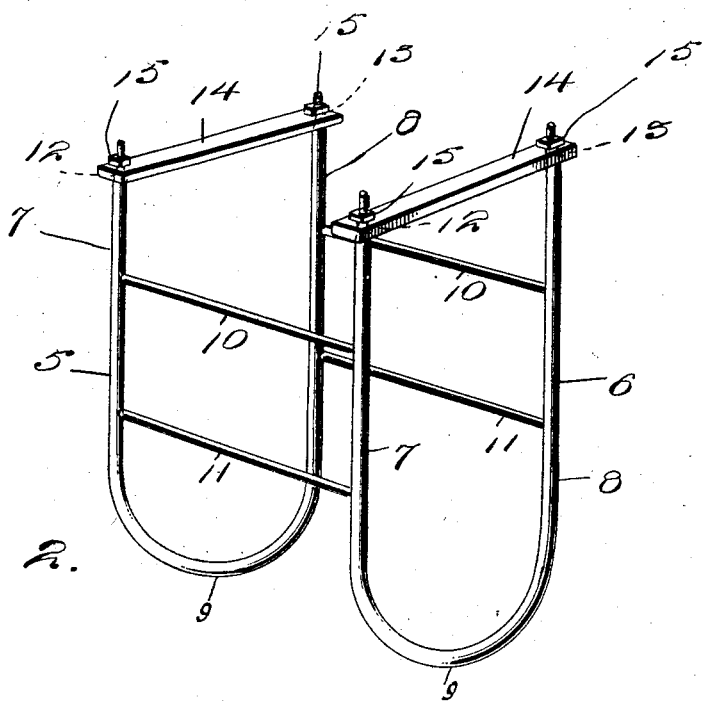

In the drawings forming a portion of this specification, and in which like numerals of reference indicate similar parts in both views, Figure 1 is a view of the device in place upon a cow's neck. Fig. 2 is a perspective view of the device removed.

Referring now to the drawings, there is shown a neck-stall comprising two metallic rods which are bent into the form of yokes 5 and 6, comprising spaced side portions 7 and 8 and connecting-bights 9. The side portions of each yoke are connected to those of the other by pairs of rods 10 and 11, which are welded at their ends to the side portions. The yokes 5 and 6 are disposed with their open ends in the same direction, and the side portions 7 and 8 have their free ends removably engaged in perforations 12 and 13 in the ends of connecting cross-pieces 14, the side portions beyond the cross-pieces being threaded for the reception of nuts 15 to hold the cross-pieces in place.

In placing the stall upon the neck of an animal the nuts and cross-pieces are removed, and the device is disposed so that the pairs of rods 10 and 11 lie at opposite sides of the animal's neck, with the free ends of the yokes projecting thereabove. The cross-pieces 14 are now disposed in position, and the nuts 15 are engaged with the threaded ends of the side portions 7 and 8 to prevent displacement of the cross-pieces. With the stall so disposed it is impossible for the animal to bend its neck, and it is thus prevented from biting its sides or sucking its milk.

What is claimed is—

1. A device of the class described, comprising spaced U-shaped members having their free ends turned in the same direction, rods connected to the side portions of the two members, and a cross-piece removably connected to the free ends of each member.

2. As an article of manufacture, a neck-stall for animals comprising two metallic rods bent into U shape, the free ends of the two rods being turned in the same direction, rods welded at their ends to the first-named rods, at opposite sides of the U's and cross-pieces having perforations therein, with which the ends of the rods are removably engaged.

In testimony whereof I affix my signature in presence of two witnesses.

ALBERT J. GRIFFITH.

Witnesses:
 W. A. ELGIN,
 L. B. PALMER.